July 8, 1969

C. F. HAUTAU 3,453,856

FORGING APPARATUS

Filed Aug. 16, 1967

INVENTOR
CHARLES F. HAUTAU

BY
Marechal, Biebel, French & Bugg
ATTORNEYS

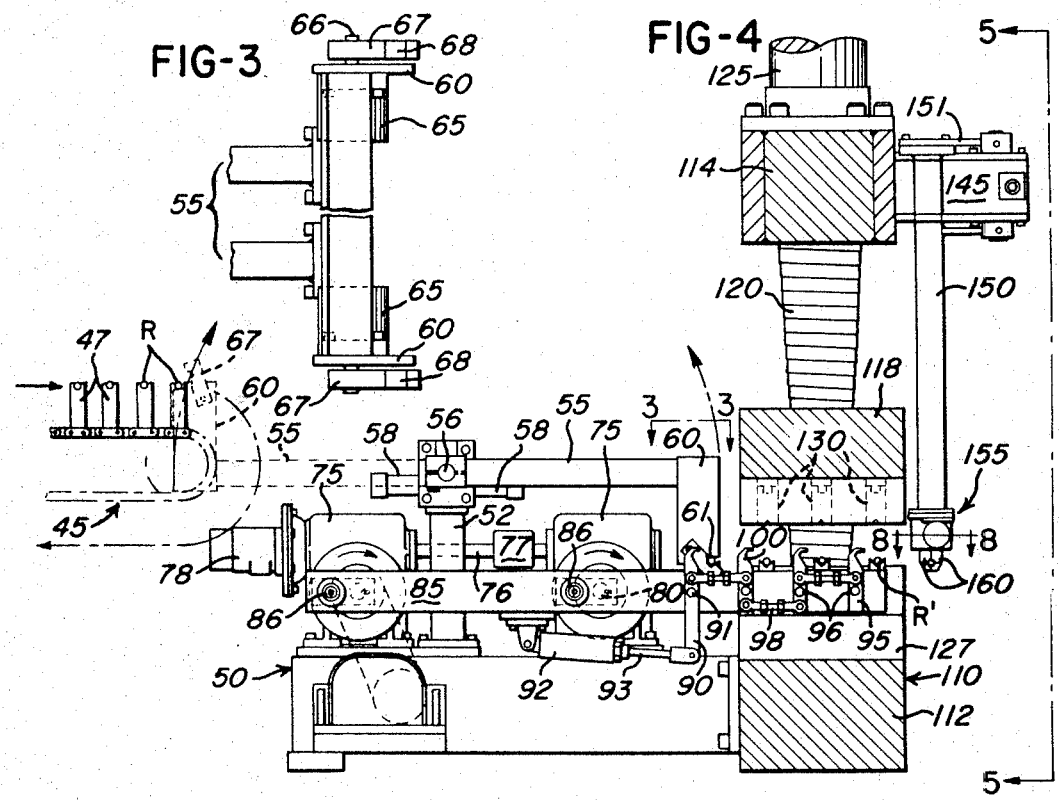
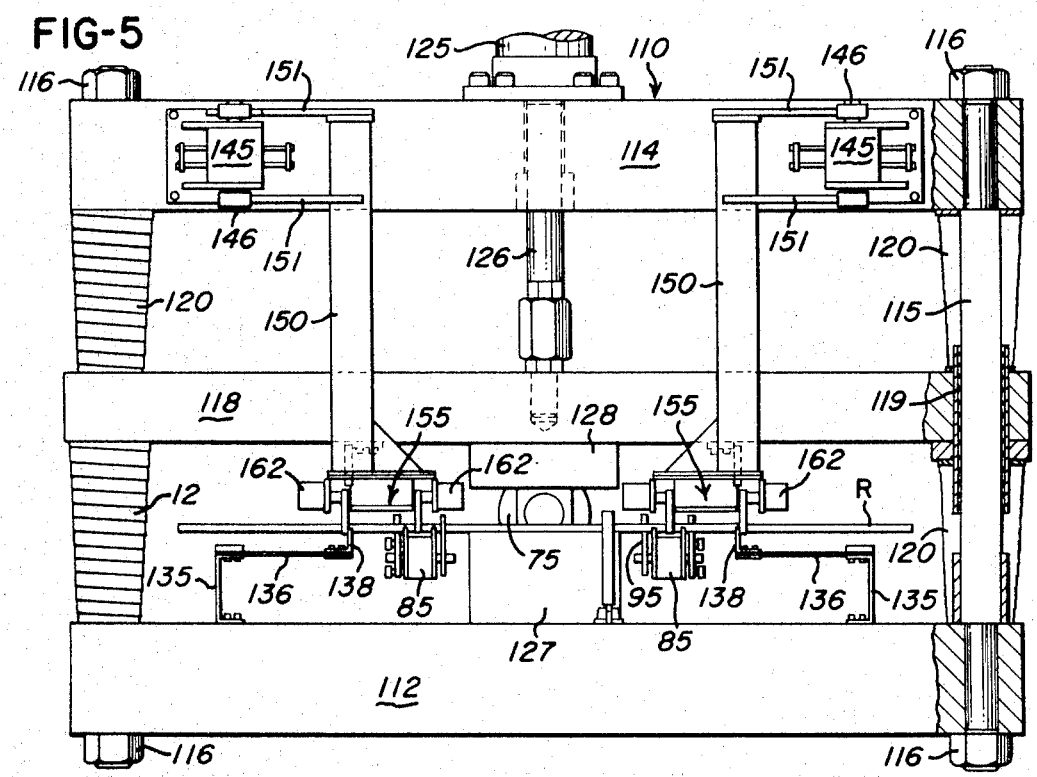

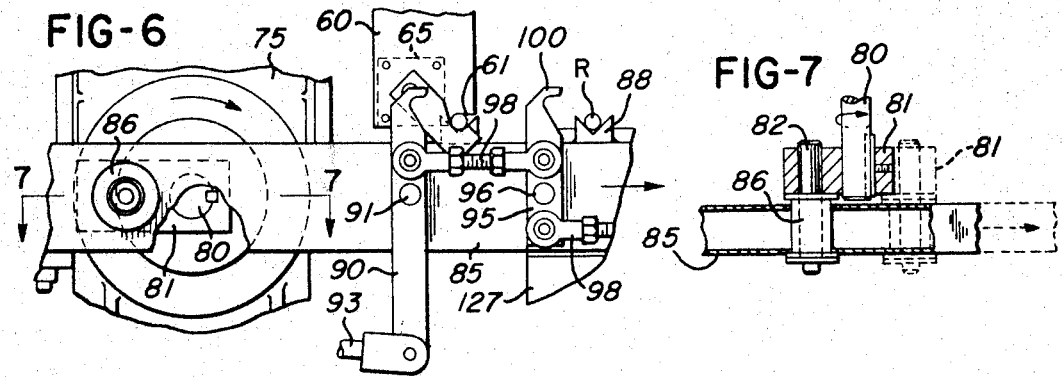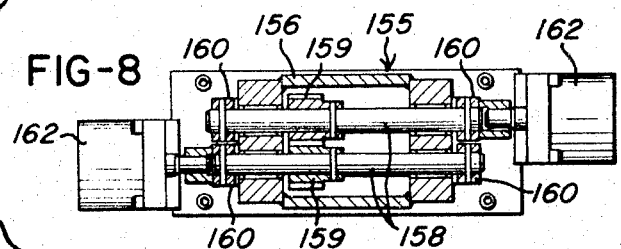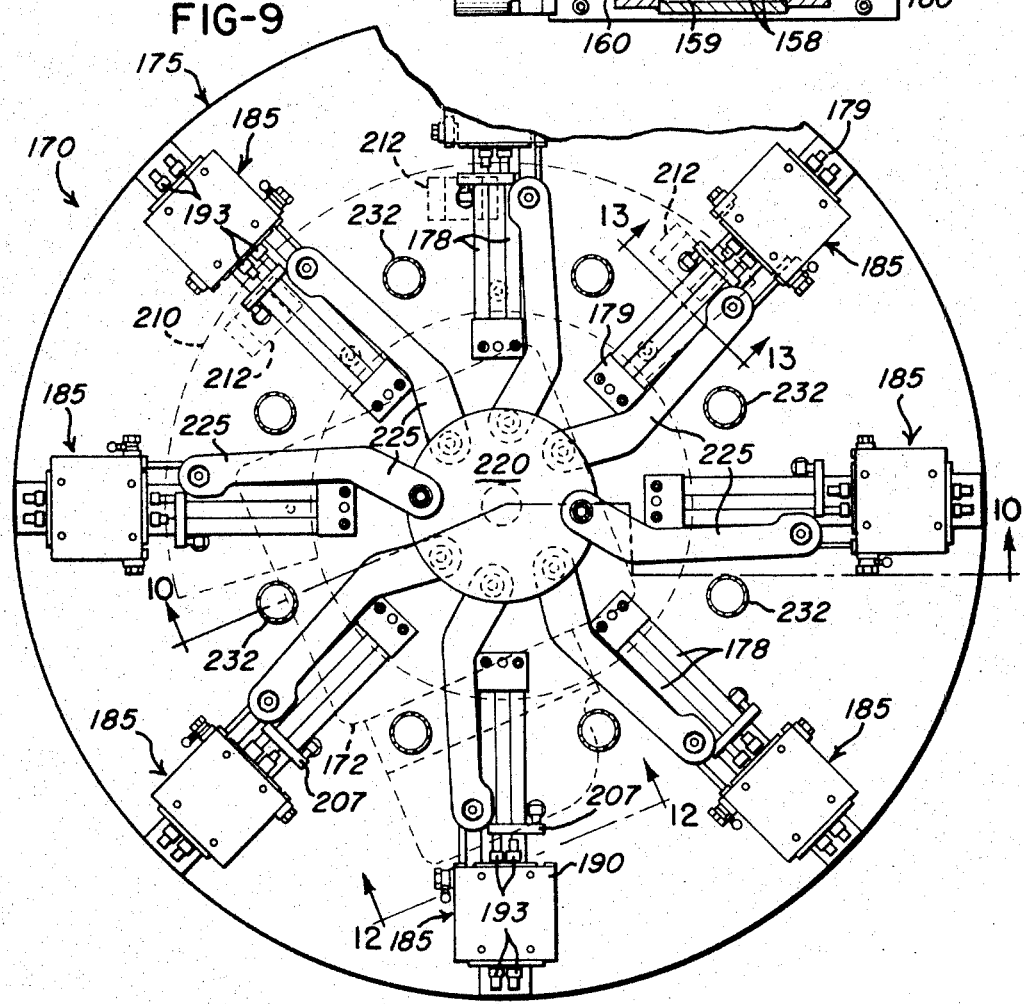

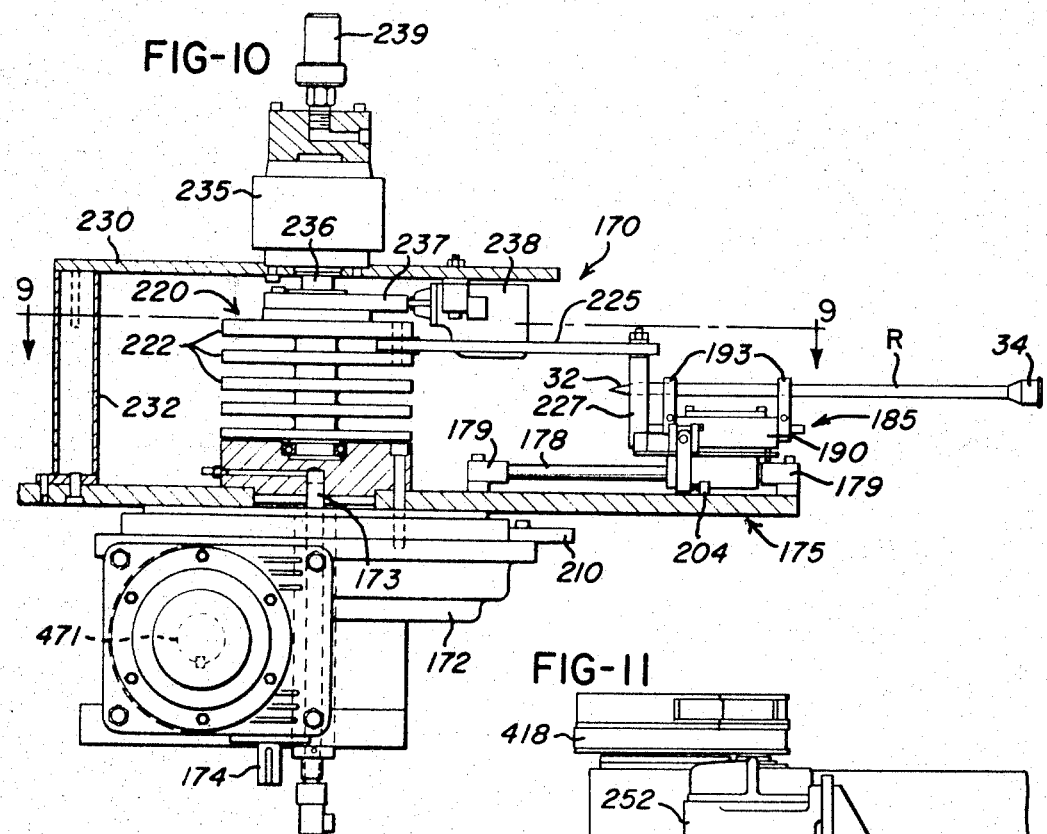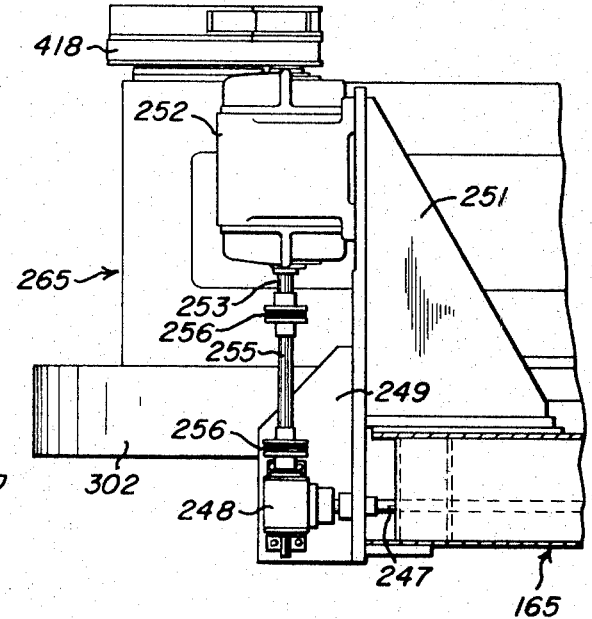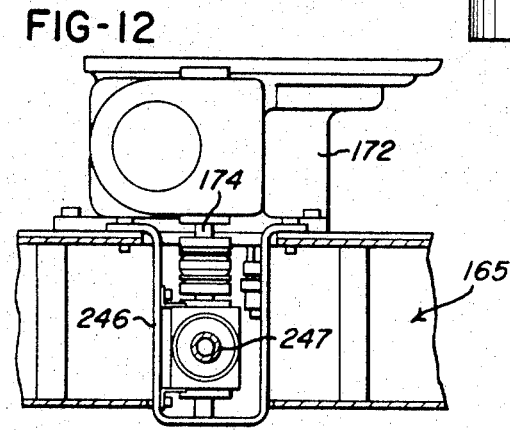

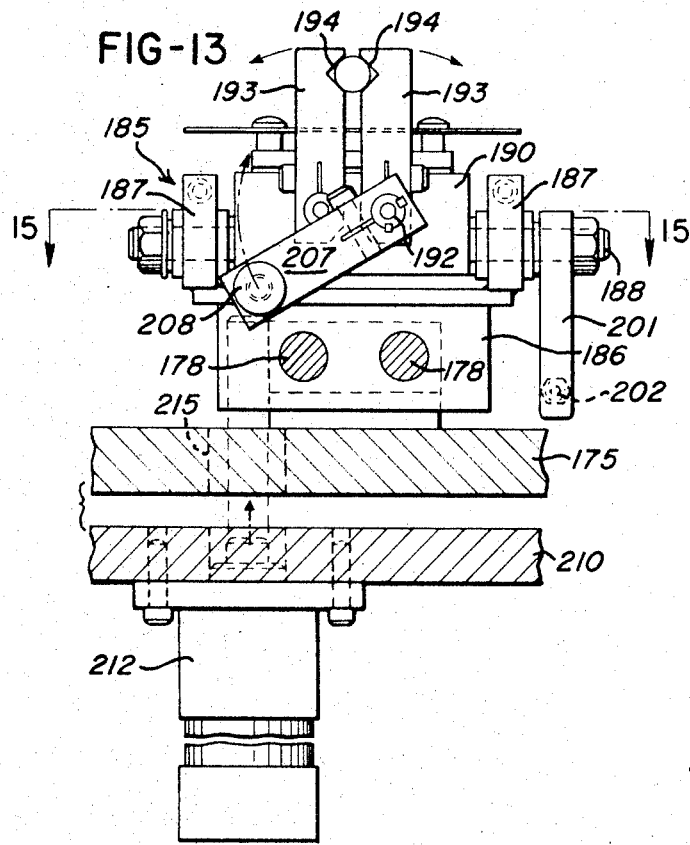
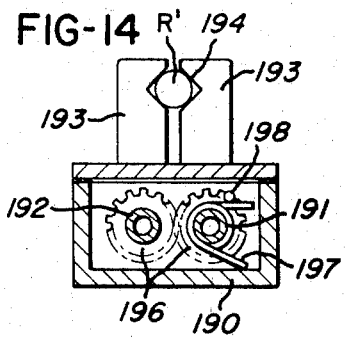
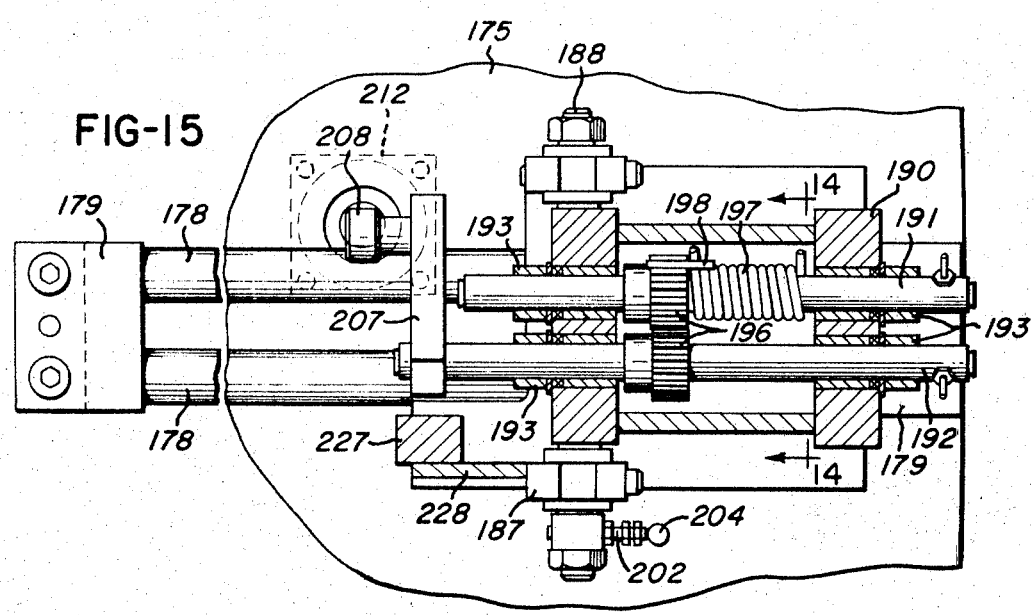

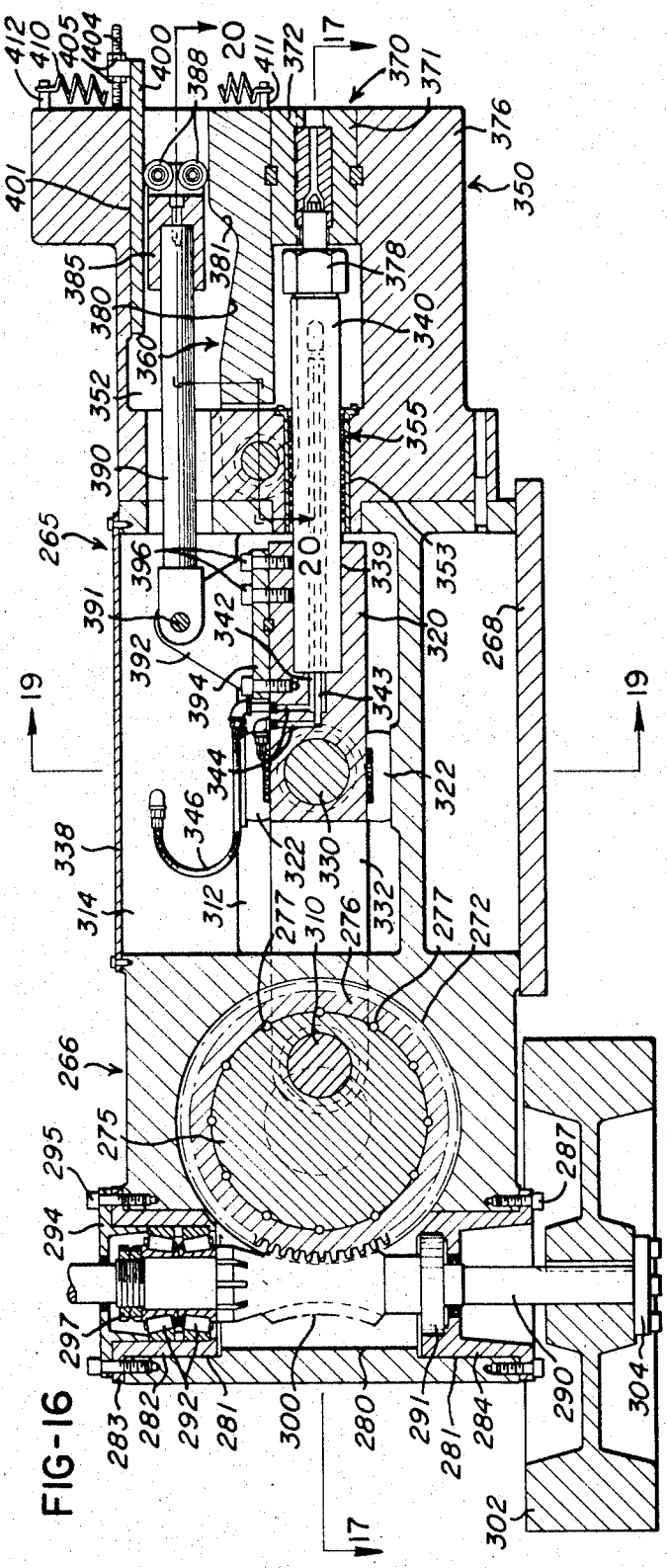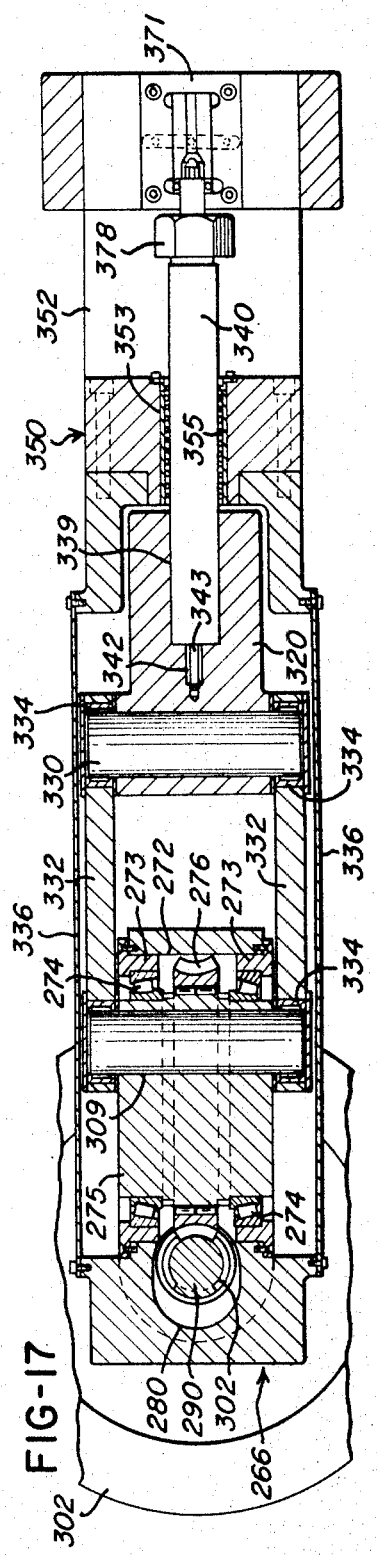

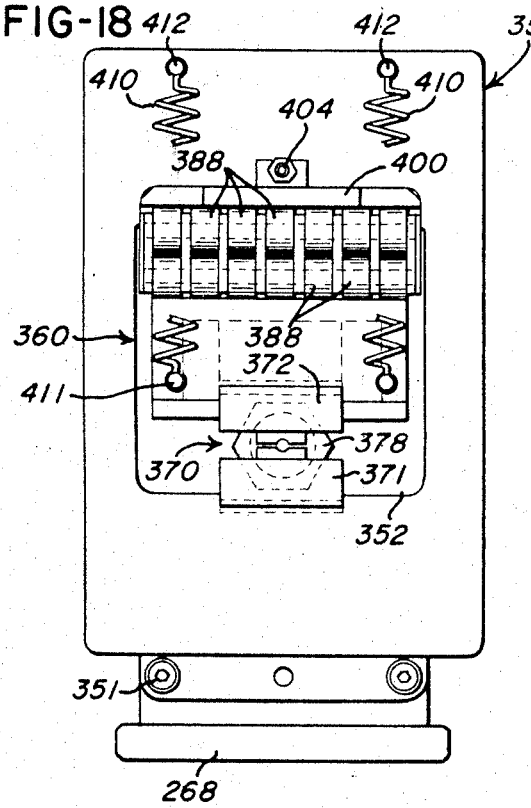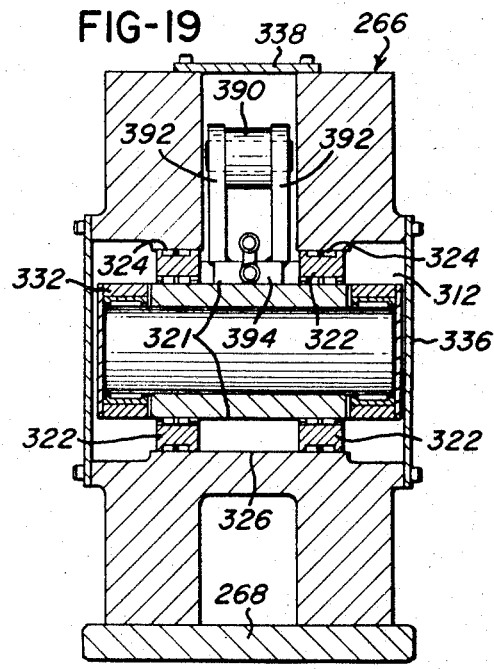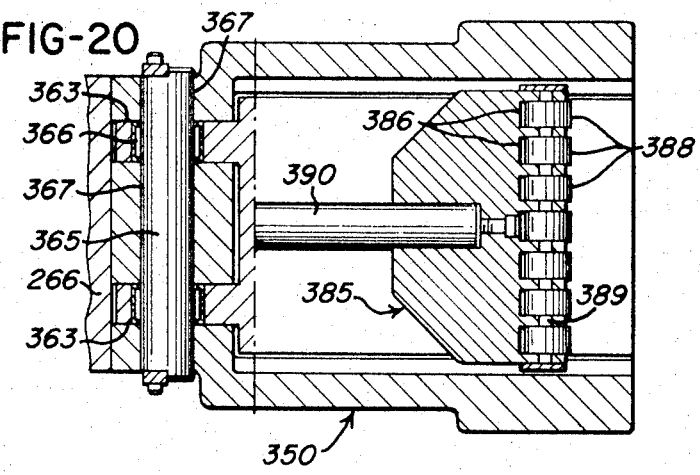

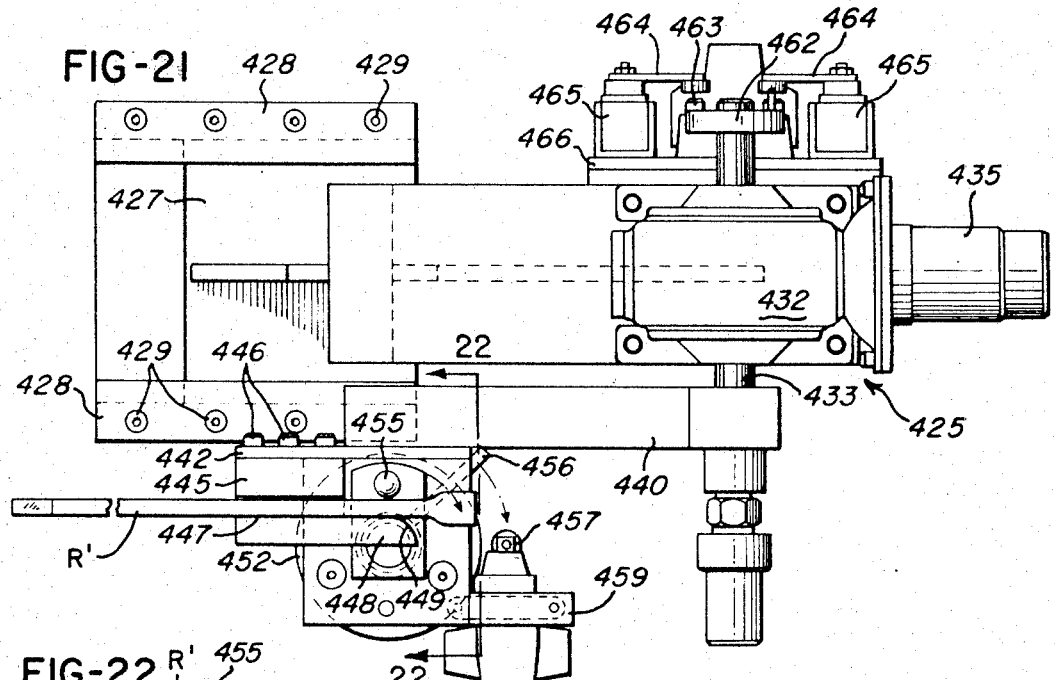
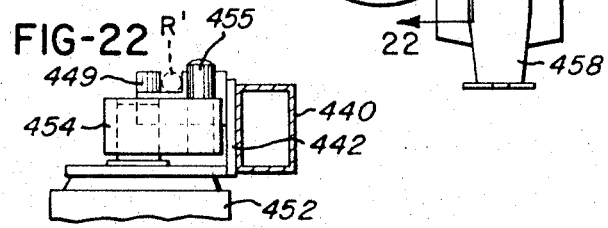
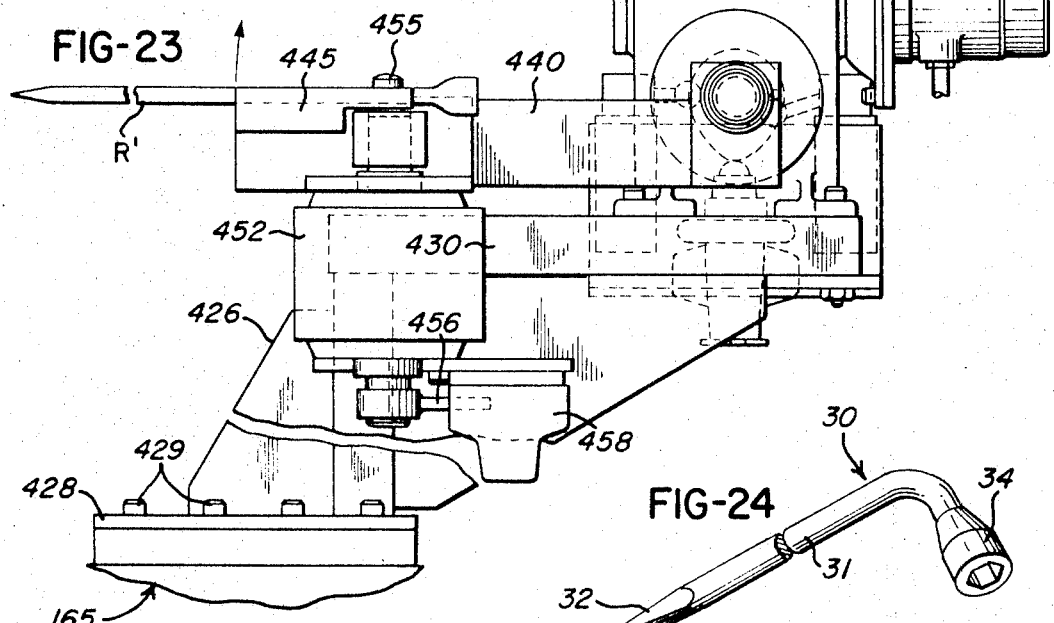
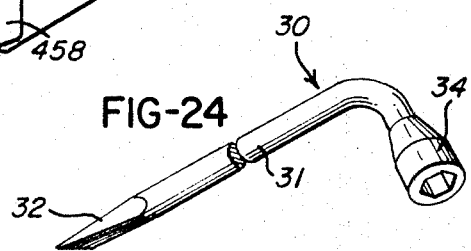

United States Patent Office  3,453,856
Patented July 8, 1969

3,453,856
FORGING APPARATUS
Charles F. Hautau, Oxford, Ohio, assignor to The Black Clawson Company, Hamilton, Ohio, a corporation of Ohio
Filed Aug. 16, 1967, Ser. No. 661,085
Int. Cl. B21d 11/04, 43/02; B21j 11/00
U.S. Cl. 72—306                                      23 Claims

ABSTRACT OF THE DISCLOSURE

Apparatus for the high speed production of forged articles from a supply of preheated workpieces, wherein a hydraulic drop forging press incorporates progressive die sets and a pair of parallel spaced horizontal arms which gyrate to advance each workpiece to each die set, a plurality of upset forging presses are radially arranged around a rotary indexing table having a plurality of angularly disposed and radially movable gripping devices which successively receive the workpieces from the drop forging press and successively present each workpiece to each upset forging press for receiving progressive forging operations, and each upset forging press has a compact construction and is dynamically balanced on its centerline to obtain high speed and precise operation.

BACKGROUND OF THE INVENTION

In the production of lug wrenches for vehicle tires of the type having an angular configuration with a socket head on one end and a screw driver tip on the opposite end, and which also serve as a handle for a bumper jack, both the socket head and the screw driver tip are commonly formed by progressive forging operations. That is, the socket head is formed on an upset forging press by manually transferring the preheated end portion of a rod in successive steps to a progressive series of split female dies which grip the end portion of the rod while corresponding male punches cooperate to head and shape the end portion into the socket head. After the head is formed, the opposite end portion of the rod is preheated and is manually transferred in successive steps to a progressive series of die sets on a drop forging press which cooperate to flatten, shape and trim the end portion into the screw driver tip.

The rod is then heated a third time in an area adjacent the socket head for performing a bending operation which provides the rod with the angular configuration. The above procedure for producing lug wrenches involves considerable handling of each rod especially for transferring the rod to the different die sets, and this handling substantially increases the time and cost for producing the wrenches.

SUMMARY OF THE INVENTION

The present invention is directed to improved forging apparatus which is ideally suited for producing a high volume of lug wrenches by automatically and quickly performing a progressive series of both drop and upset forging operations on a successive supply of preheated workpieces in the form of elongated rods and thereby providing a significant reduction in the cost for producing the wrenches. The forging apparatus provides a number of features and advantages which are described herein with reference to a forging facility for producing lug wrenches. It is to be understood, however, that the novel structure which provides these features and advantages is not limited to apparatus for producing lug wrenches for vehicle tires but may be employed in forging facilities for producing other articles such as long bolts or screws with socket heads or various types of socket wrenches.

Generally, the forging apparatus constructed in accordance with the invention for producing lug wrenches includes a transfer device having a pair of parallel spaced horizontal arms which successively receive a series of preheated rods each having a length equal to approximately twice the length of a lug wrench. Each rod is advanced in successive steps by rotation of the arms in a circular path to a progressive series of drop forging die sets which flatten, shape and shear the center portion of the rod to form a pair of rods each having a screw driver tip on one end. Each pair of rods are then gripped and transferred by a pair of oscillating depending arms to a rotary indexing table having a series of angularly arranged and radially movable gripping devices which receive and clamp the rods with the screw driver tips pointed radially inwardly.

A plurality of upset forging presses are arranged radially around the table at successive stations, and each press is provided with a reciprocating male punch and a corresponding split female die set which opens and closes in timed relation with the movement of the punch. As the table indexes, the gripping devices move radially outwardly for successively inserting the outer end portion of each preheated rod into the female die set of each press. While the outer end portion of each rod is being gripped by the female die set, the rod is impacted by the corresponding punch whereby the socket head is progressively formed on the outer end portion of each rod.

The upset forging presses operate in timed relation with each other and with the indexing of the table to provide high speed operation of the apparatus so that the preheated rods do not cool substantially before each wrench is completely forged. Furthermore, each press has a compact construction with low friction moving components and with the main impact forces being balanced on its centerline so that each press is particularly suited for high speed operation for an extended period of time.

After each rod having a socket head on one end and a screw driver tip on the opposite end is advanced by the rotary table from the final upset forging press to a discharge station, a transfer arm receives each rod from each gripping device and transfers the rod to a conveyor or tote box, simultaneously bending the rod to produce the angular configuration. As mentioned above, while the forging apparatus disclosed herein provides for producing lug wrenches automatically and at a substantially higher rate than heretofore obtained, it will become apparent that the structure of the invention may be adapted for use on other forging equipment especially where high speed operation is desired for producing a high volume of forged articles.

BRIEF DESCRIPTION OF THE DRAWINGS

FIG. 3 is a fragmentary view taken generally on the line 3—3 of FIG. 4;

FIG. 4 is a section generally on the line 4—4 of FIG. 2;

FIG. 5 is an elevational view taken generally on the line 5—5 of FIG. 4;

FIG. 6 is an enlarged fragmentary view of the workpiece advancing mechanism shown in FIG. 4;

FIG. 7 is a fragmentary section generally on the line 7—7 of FIG. 6;

FIG. 8 is a section generally on the line 8—8 of FIG. 4;

FIG. 9 is a plan view of the indexing table as taken generally on the line 9—9 of FIG. 10;

FIG. 10 is a fragmentary section generally on the line 10—10 of FIG. 9;

FIG. 11 is a fragmentary section generally on the line 11—11 of FIG. 2;

FIG. 12 is a fragmentary section generally on the line 12—12 of FIG. 9;

FIG. 13 is a fragmentary section generally on the line 13—13 of FIG. 9;

FIG. 14 is a section generally on the line 14—14 of FIG. 15;

FIG. 15 is a fragmentary section generally on the line 15—15 of FIG. 13;

FIG. 16 is a vertical axial section of an upset forging press constructed in accordance with the invention and taken generally on the line 16—16 of FIG. 2;

FIG. 17 is a section generally on the line 17—17 of FIG. 16;

FIG. 18 is an elevational view of the forward end of a forging press as taken generally on the line 18—18 of FIG. 2;

FIG. 19 is a section generally on the line 19—19 of FIG. 16;

FIG. 20 is a fragmentary section generally on the line 20—20 of FIG. 16;

FIG. 21 is a plan view of a combined transfer and bending mechanism constructed in accordance with the invention;

FIG. 22 is a fragmentary section generally on the line 22—22 of FIG. 21;

FIG. 23 is an elevational view of the mechanism shown in FIG. 21; and

FIG. 24 is a perspective view of a combined tire wrench and jack handle formed automatically by the apparatus in FIGS. 1–23.

DESCRIPTION OF THE PREFERRED EMBODIMENT

Figure 1:
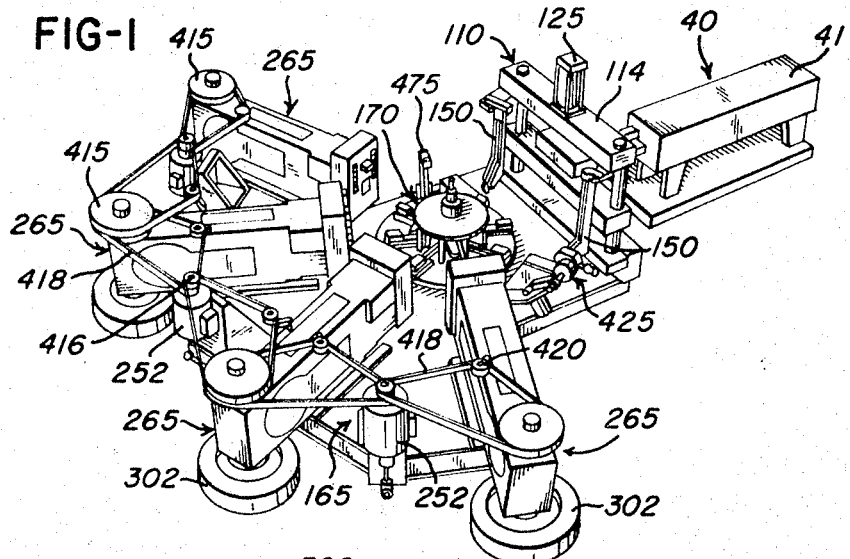
FIG. 1 is a perspective view of forging apparatus constructed in accordance with the invention.
Figure 2:
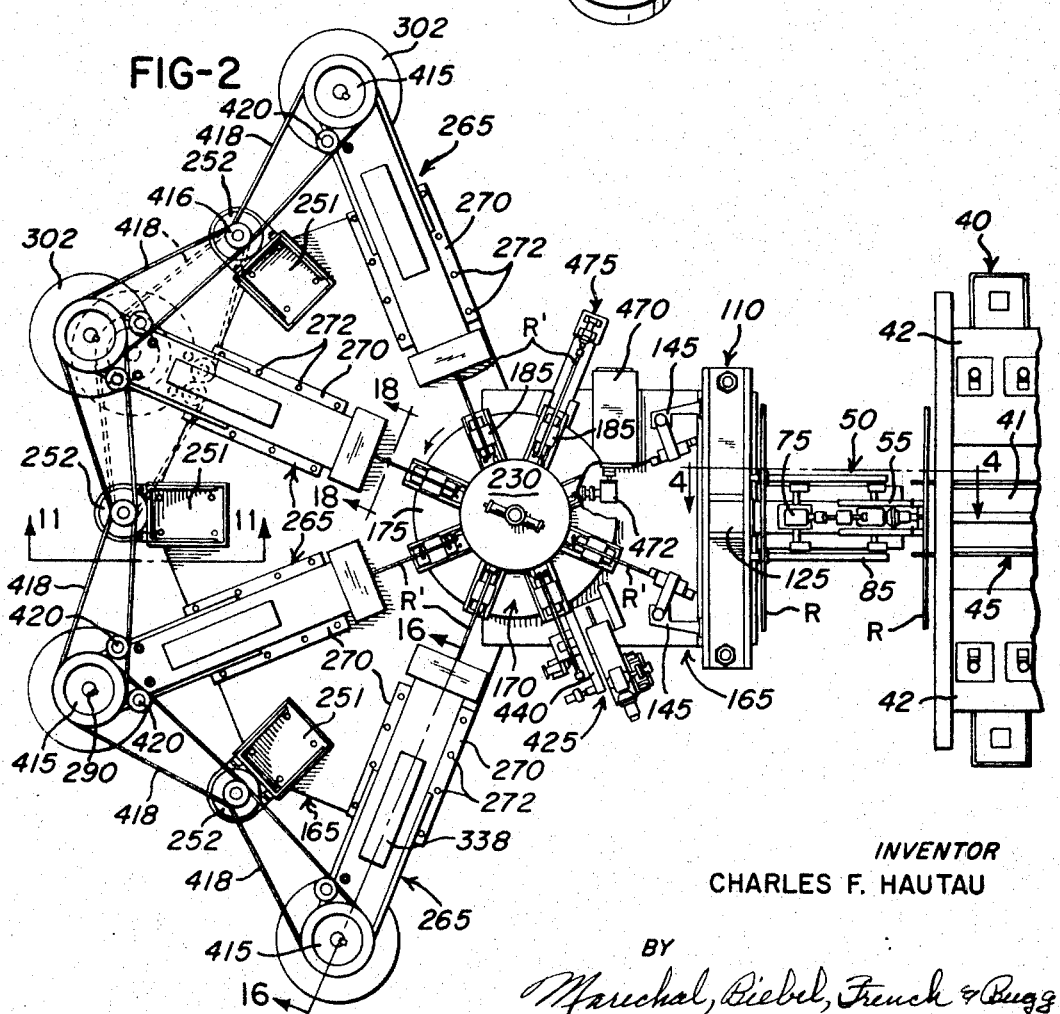
FIG. 2 is a plan view of the apparatus shown in FIG. 1 and including a fragmentary view of a preheating furnace.

FIGS. 1 and 2 show a forging facility constructed in accordance with the invention for automatically producing a tire or lug wrench 30 (FIG. 24) having an angular shank portion 31 with a screw driver tip 32 formed on one end and a socket head 34 formed on the opposite end. As mentioned above, while a lug wrench is used herein for illustrating the features and advantages of a forging apparatus constructed in accordance with the invention, it is understood that the forging apparatus may be adapted for producing other forged articles, as for example, any article requiring a series of progressive upset forging operations to form a predetermined configuration.

Preheat furnace

As illustrated in FIGS. 1 and 2, the forging apparatus of the invention is adapted to be used in conjunction with a gas fired furnace which is illustrated diagrammatically at 40 and includes a center section 41 spaced between a pair of side sections 42. An endless conveyor 45 (FIG. 4) is mounted on the center section 41 and includes parallel spaced chains 46 on which are mounted corresponding aligned support arms 47. A workpiece in the form of an elongated rod R is placed on each pair of support arms 47 ahead of the furnace so that each rod is carried through the furnace 40 where the center section 41 preheats the center portion of the rod R and the side sections 42 preheat the opposite end portions of the rod.

Transfer mechanism

A transfer mechanism 50 (FIGS 2 and 4) is positioned adjacent the furnace 40 and includes a base 51 which supports a pedestal 52. A transfer arm 55 is mounted on a shaft 56 which is supported by the pedestal 52 for oscillation through 180° by actuation of a pair of hydraulic cylinders 58. A pair of parallel spaced support plates 60 (FIGS. 3 and 4) extend at right angles from the arm 55 and are provided with aligned notches 61. When the arm 55 is rotated to a 9 o'clock position (FIG. 4), the notches 61 are positioned to receive a preheated rod R from the furnace conveyor 45. As shown in FIG. 3, a pair of rotary hydraulic actuators 65 are mounted on the arm 55 adjacent the plates 60 and have output shafts which support corresponding fingers 67 having notches 68. When the shafts of the actuators 65 are rotated in one direction, the fingers 67 secure a rod R within the aligned notches 61 and 68, and when the shafts are rotated in the opposite directions, the rod is released.

A pair of gear reducing units 75 (FIG. 4) are mounted on the base 51 and are connected by a shaft 76 and coupling 77 for simultaneous operation by a hydraulic motor 78. Each unit 75 includes an output shaft 80 (FIGS. 6 and 7) supporting on each end a crank arm 81 from which extends an eccentrically positioned crank shaft 82. A pair of parallel spaced arms 85 (FIGS. 5 and 6) are spaced on opposite sides of the units 75, and each arm is mounted by a pair of bearings 86 (FIG. 7) on the corresponding crank shaft 82. Thus when the units 75 are operated by the motor 78, the arms 85 move in a circular path or gyrate while remaining horizontal at all times.

Referring to FIGS. 4 and 6, a corresponding series of aligned saddle supports 88 are mounted in uniformly spaced relation on the upper surfaces of the arms 85, and the first set of aligned supports 88 is adapted to receive a rod R which is transferred from the furnace conveyor 45 by the arm 55 when the arm 55 is moved to a 3 o'clock position by the cylinders 58. A pair of parallel spaced fingers 90 (FIG. 6) are pivotally mounted on the arms 85 by pins 91 and are pivoted by actuation of a corresponding hydraulic cylinder 92 mounted on the lower surface of each arm 85 and having a connecting rod 83 connected to the lower end portion of the corresponding finger 90.

A series of uniformly spaced fingers 95 (FIGS. 4 and 6) are pivotally mounted on each arm 85 by pins 96 with a pair of fingers for each pair of supports 88, and are successively connected to the corresponding finger 90 by adjustable tie bolts 98 so that each finger 95 moves simultaneously in the same direction with the movement of the corresponding finger 90. The upper end portion 100 of each finger 90 and 95 has a hooked shaped configuration so that when the piston rod 93 of the corresponding cylinder 92 is retracted, the fingers 90 and 95 pivot to lock a rod R on the corresponding saddle supports 88.

Drop forging press

A drop forging press 110 (FIGS. 4 and 5) is tied to the transfer mechanism 50 by screws 111, and includes a lower horizontally extending support member 112 (FIG. 5) which is connected to a parallel spaced upper support member 114 by a pair of vertically extending rods 115 rigidly secured to the support members 112 and 114 by nuts 116. An elongated head member 118 is mounted on the rods 115 for vertical movement by a pair of anti-friction linear sleeve bearings 119. Telescopic spiral casings 120 surround the rods 115 on opposite sides of the head member 118 for protecting the outer surface of the rods 115 and the anti-friction bearings 119.

A hydraulic cylinder 125 is mounted on the upper support member 114 and includes a downwardly extending piston rod 126 which is rigidly secured to the head member 118. A lower die member 127 is mounted on the upper surface of the lower support member 112, and a mating upper die member 128 is mounted on the underneath surface of the head member 118 directly above the lower die member 127. The die members 127 and 128 include a progressive series of die sets 130 (FIG. 4).

Referring to FIG. 5, a pair of channel-shaped brackets 135 are mounted on the lower support member 112 on opposite sides of the lower die member 127, and each bracket 135 supports a series of horizontally spaced flat springs 136, one for each die set 130. A bracket 138 is mounted on each spring 136, and each corresponding pair of brackets 138 are provided with V-shaped notches which align with the corresponding die sets of the die members 127 and 128. Thus when the output shafts 80 of the units 75 are rotated by the motor 78 in timed relation with the oscillation of the arm 55, the actuation of the cylinders 92 and the vertical movement of the head member 118, the arms 85 advance each rod R to each set of aligned support brackets 138 and thereby progressively advance each rod to each set of die members 130.

Referring to FIG. 5, a pair of hydraulic motors 145 are mounted on the front surfaces of the upper support 114 of the drop forging press 110, and each motor 145 has a vertically extending shaft 146. A transfer arm 150 is supported by each motor 145 by parallel spaced plates 151 connected to opposite ends of the corresponding motor shaft 146. A gripping head 155 is mounted on the lower end portion of each arm 150 and includes a housing 156 (FIGS. 4, 5 and 8) which supports a pair of parallel spaced shafts 158 connected for simultaneous rotation by a pair of spur gears 159. A pair of pinch fingers 160 are mounted on the corresponding end portions of the shafts 158 and are opened and closed by actuation of a pair of hydraulic oscillating motors 162 connected to the shafts 158 by couplings 163.

As each rod R is progressively advanced between the die members 127 and 128 of the forging press 110, the central portion of each rod R is progressively flattened, shaped and sheared to form two rods R' each having a screw driver tip 32 on one end. When the pair of rods R' are advanced by the pair of aligned saddle supports 88 adjacent the outer ends of the arms 85, each rod is gripped by the fingers 160 of the corresponding gripping head 155 mounted on each transfer arm 150.

*Rotary transfer mechanism*

A fabricated platform 165 (FIGS. 1 and 2) extends horizontally from the hydraulic drop forging press 110 and supports a rotary transfer device 170 having a housing 172 (FIGS. 10 and 12) mounted on the platform 165. The housing 172 encloses an indexing transmission having an upwardly extending output shaft 173 (FIG. 10) and a downwardly extending input shaft 174. A circular index table 175 has a hub portion 176 mounted on the output shaft 173.

Referring to FIGS. 9 and 10, a series of pairs of parallel spaced guide rods 178 and are mounted on the table 175 in angularly spaced relation and extend radially between the corresponding end support blocks 179 secured to the table. A gripping device 185 is supported by each pair of guide rods 178 and includes a slide block 186 (FIG. 13) having holes for receiving the guide rods 178. Referring to FIGS. 13 and 15, each block 186 supports a pair of bearing members 187 which rotatably support a shaft 188.

A housing 190 is mounted on the shaft 188 and supports a pair of parallel spaced shafts 191 and 192. A finger 193 is secured to each end portion of each shaft 191 and 192 outboard of the housing 190, and corresponding sets of fingers 193 each have opposing notches 194 (FIG. 14) for receiving a rod R' as shown in FIG. 10. A set of engaging spur gears 196 are mounted on the shafts 191 and 192 in the housing 186 to cause simultaneous rotation of the shafts 188 and 189 in opposite directions for simultaneously opening and closing the fingers 193. These fingers are normally biased towards a closed position (FIG. 14) by a torsion coil spring 197 mounted on the shaft 191 and having one end portion engaging the housing 190 and the opposite end engaging a pin 198 secured to the adjacent spur gear 196 between a pair of adjacent teeth.

A downwardly extending lever 201 (FIG. 13) is secured to one end portion of the shaft 188 and supports an adjusting screw 202 which is adapted to engage a stud 204 (FIG. 10) projecting upwardly from the table 175 when the slide block 186 approaches its outer limit of travel on the rods 178 thereby tilting the housing 190 and rod R downwardly against the bias of a short compression spring 205 (FIG. 10).

Referring to FIGS. 13 and 15, a crank arm 207 is mounted on the inner end portion of the shaft 192 and supports a roller 208. As shown in FIGS. 9 and 10, an arcuate plate 210 is mounted on the housing 172 and supports a set of three angularly spaced pressure cylinders 212 each having a piston rod 213 (FIG. 13) which moves upwardly through one of a series of aligned holes 215 formed within the table 175 for engaging the roller 208 mounted on the arm 207 of each gripping device 185 and thereby pivoting the fingers 193 towards an open position at the three corresponding stations of the index table 175.

Referring to FIG. 10, a crank member 220 is supported for rotation on a vertical axis by a lower bearing 221 retained by the hub 176 of the table 175. The crank member 220 includes a series of parallel spaced disks 222 which receive the inner end portions of a series of arms 225 (FIG. 9) angularly arranged with one arm for each gripping device 185. The outer end portion of each arm 225 is connected to the corresponding gripping device 185 by a bar 227 (FIG. 10) rigidly connected to the body 186 by a bracket 228 (FIG. 15).

A circular plate 230 is spaced above the table 175 and is rigidly secured to the table by a series of support posts 232 (FIGS. 9 and 10). An oscillating hydraulic motor 235 is mounted on the plate 230 and has an output shaft 236 connected to the upper end portion of the crank member 220. The shaft 236 also supports a cam member 237 for actuating a reversing valve 238 for the motor 235. Hydraulic fluid is supplied to valve 238 for the motor 235 through a rotary union 239 (FIG. 10) so that when the motor 235 rotates the crank member 220 in opposite directions relative to the table 175, the gripping devices 185 extend and retract simultaneously.

As mentioned above, the table 175 is indexed intermittently by the indexing transmission enclosed within the housing 172. The input shaft 174 of the transmission is connected to a gearbox 245 (FIG. 12) supported by a U-shaped bracket 246 mounted on the platform 165. A shaft 247 (FIG. 11) extends horizontally within the platform 165 and connects the gearbox 245 to another gearbox 248 mounted on a plate 249. As shown in FIGS. 1 and 2, a series of three triangularly shaped frames 251 are mounted on the platform 165 and extend upwardly to support corresponding electric motors 252 each having a vertically extending shaft 253. The center bracket 251 supports the plate 249 and as shown in FIG. 11, the lower end portion of the shaft 253 of the center motor 252 is connected to the gearbox 248 by a shaft 255 and a pair of flexible couplings 256.

*Upset forging presses*

Referring to FIGS. 1 and 2, a series of four mechanical upset forging presses 265 are mounted on the platform 165 and are radially disposed in relation to the rotary indexing transfer device 170 with each press defining a corresponding operation station. Referring to FIGS. 16 and 17, each press 265 includes a housing 266 mounted on a bottom support plate 268 which is adjustably secured to the platform 165 by a pair of parallel spaced elongated L-shaped guide tracks 270 (FIG. 2) which are secured to the platform 165 by a series of screws 272 so that the housing 266 of each press may be adjusted radially in relation to the vertical axis of the index table 175 and then clamped to the platform 165 by tightening the screws 272.

The housing 266 of each press 265 is provided with a cylindrical bore 272 (FIGS. 16 and 17) which receives a pair of rings 273 for retaining the outer races of a corresponding pair of large anti-friction roller bearings 274. A disk-like crank member 275 is supported by the inner races of the bearings 274 and has a ring gear 276 secured to the central portion of its outer surface between bearings 274 by a series of circumferentially spaced interlocking pins 277 (FIG. 16).

A vertically extending opening 280 is formed within the rear end portion of the housing 266 and has upper and lower aligned counterbores 281. A bearing retaining housing 282 is mounted within the upper counterbore 281 and has an upper end flange 283 which seats on the housing 266. Similarly, a bearing retaining housing 284 is mounted within the lower counterbore 281 and has a bottom flange 286 which is secured to the housing 266 by a series of screws 287.

A vertically extending shaft 290 extends through the opening 280 and has a lower end portion supported by a single anti-friction bearing 291 mounted within the lower retaining housing 284. The upper end portion of the shaft 290 is supported by a pair of anti-friction thrust bearings 292 mounted within the housing 282. The outer races of the upper bearings 292 are retained by a cap 294 secured to the housing 266 by a series of screws 295, and the inner races of the bearings are secured by a pair of lock nuts 297 threaded on the shaft 290. A worm gear 300 is mounted on the shaft 290 between the bearings 291 and 292 and engages the ring gear 276 mounted on the crank member 275 so that both the gears 276 and 300 are located on the longitudinal centerline of the forging press. A flywheel 302 is mounted on the lower end portion of the shaft 290 and is retained by an end support plate 304.

The crank disk or member 275 of each press 265 is formed with an axially extending eccentric bore 309 (FIG. 17) which receives a shaft 310 having opposite end portions projecting from opposite sides of the crank member. Referring to FIGS. 16 and 19, a longitudinally extending chamber 312 is formed within the housing 266 of each press 265 and intersects vertically extending and centrally located chamber 314. A generally rectangular ram 320 is positioned within the chamber 312 and has parallel spaced upper and lower flat surfaces 321. The ram 320 is supported and guided by a pair of upper and lower preloaded linear anti-friction bearings 322 having rollers which engage the corresponding upper and lower flat surfaces 321 of the ram 320 and the corresponding opposing flat upper surfaces 324 and lower surface 326 formed on the housing 266.

A shaft 330 (FIG. 17) extends horizontally through the ram 320 and has opposite end portions projecting from the sides of the ram. A pair of parallel spaced arms 332 receive the crank member 275 and ram 320 therebetween, and each arm 332 supports a pair of needle bearings 334 for connecting the corresponding end portions of the shafts 310 and 330. A removable cover plate 336 is mounted on each side of the housing 266 and covers the chamber 312 as well as the space for receiving the arms 332 adjacent each end of the crank member 270. In addition, a removable top cover 338 (FIG. 16) is secured to the housing 266 over the chamber 314.

The forward end portion of the ram 320 is provided with a horizontally extending bore 339 which receives an elongated cylindrical rod or plunger 340 having an axially extending center passageway 341 which is connected to a chamber 342. A tube 343 extends within the passageway 341 and chamber 342, and the tube and chamber are connected by passageways 344 to flexible conduits 345 for circulating cooling water to cool the forward end portion of the plunger 340.

A cast head 350 is secured to the housing 266 of each press 265 by a series of screws 351 (FIG. 18). A cavity 352 is formed within each head 350, and a cylindrical bore 353 extends from the cavity 351 within the rear portion of the head 350 for receiving a preloaded linear anti-friction sleeve bearing 355 which supports the plunger 340 for reciprocating movement. The bearing 355 includes a cylindrical outer race which is secured within the bore 353 and encloses a cylindrical sleeve having circumferentially and axially spaced holes for receiving corresponding balls.

A generally flat arm 360 (FIG. 16) is located within the cavity 352 and includes nearwardly extending ears 362 (FIG. 20) which extend into corresponding slots 363 formed within the head 350. The arm 360 is pivotally supported by a shaft 365 which extends through needle bearings 366 mounted within the ears 362 and aligned bores 367 formed within the head 350.

A split female die set 370 (FIG. 16) includes a lower die member 371 rigidly secured to the head 350 and an upper die member 372 rigidly secured to the underneath surface of the arm 360. The die members 371 and 372 of each press cooperate to define a corresponding split female cavity 375 having a predetermined configuration generally conforming to the shape of the socket head portion 34 of the wrench 30. A male die member or punch 376 is removably connected to the forward end portion of the plunger 340 by a nut 378 and moves with the plunger 340 from a retracted position where it is withdrawn from the die set 370 to an extended position where it enters the cavity 75. The water circulated through the passageway 341 provides for cooling the punch 376.

A cam surface 380 forms the top surface of the arm 360 and includes a relatively steep portion 381. Referring to FIGS. 16 and 20, a follower head 385 is positioned above the arm 360 and includes a series of uniformly spaced slots 386. A pair of vertically spaced rollers 388 are mounted within each slot 386 and are supported by corresponding shafts 389 so that the bottom row of rollers engages the cam surface 380. The follower head 385 is mounted on the forward end portion of a rod 390 which extends parallel to the plunger 340 and has a rear end portion extending within the cavity 314 of the housing 266 and connected by a pin 391 to a pair of parallel spaced flanges 392 (FIG. 19) which extend upwardly from a base plate 394 secured to the ram 320 by screws 396.

A wedge plate 400 (FIG. 16) having a slightly tapered cross-section is mounted on the flat surface 401 of the head 350. An ear 402 projects upwardly from the forward end portion of the wedge plate 400 and receives a threaded stud 404 which projects forwardly from the forward face of the head 350. A pair of lock nuts 405 are mounted on the stud 404 on opposite sides of the ear 402 for adjusting the wedge plate 400 in fine increments to provide a slight change in the spacing between the bottom surface of the wedge plate 400 and the cam surface 404 on the arm 360 to control the clamping pressure applied to the upper die member 372 by the follower head 385. Referring to FIGS. 16 and 18, a pair of tension springs 410 extend between a pair of pins 411 projecting forwardly from the arm 360 and a pair of corresponding pins 412 projecting from the face of the head 350 for urging the forward end portion of the arm 360 upwardly and thereby providing a normally open position for the die set 370 when the ram and follower head are retracted.

Referring to FIGS. 1 and 2, a pulley 415 is mounted on the upper end portion of the shaft 290 of each forging press 265, and a smaller pulley 416 is mounted on the upper end portion of the shaft 253 of each motor 252. The pulley 416 of each motor is connected by an endless gear belt 418 to the corresponding pulleys 415 of the forging presses 265 spaced on oppsite sides of the motor. An idler pulley 420 is provided for each of the belts 418 and is adjustably mounted on a track connected to the housing 266 of the corresponding press 265. Thus when the presses are adjusted inwardly to position the presses closer to the indexing table 175, the idler pulleys 420 are adjusted inwardly as illustrated by the dotted lines in FIG. 2 to maintain the desired tension of the driving gear belts 418.

Transfer and bending device

Referring to FIGS. 1 and 2, a transfer device 425 is located at an approximately 5 o'clock position in relation to the rotary transfer device 170 and includes a support frame 426 (FIGS. 21 and 23) having a base 427 adjustably mounted on the platform 165 by parallel spaced guide tracks 428 secured by screws 429. The frame 426 includes a horizontally extending member 430 which supports a gearbox 432 having a horizontally extending output shaft 433. The gearbox 432 is driven by a hydraulic motor 435 mounted directly on the gearbox by a flange connection 436.

An arm 440 is mounted on one end portion of the shaft 433 and supports an L-shaped bracket 442. A block 445 is secured to the bracket 442 by screws 446 and includes a horizontally extending slot 447 and a projecting finger 448 having a uniformly curved end surface 449. A hydraulic oscillating motor 452 is mounted on the bracket 442 and has an upwardly projecting shaft 453. A block 454 is mounted on the shaft 453 and supports an eccentrically located pin 455 extending upwardly parallel to the shaft 453.

A lever 456 is mounted on the lower end portion of the shaft 453 and is adapted to engage an actuator 457 extending from a control switch 458 supported by an L-shaped bracket 459 mounted on the lower end of the motor 452. The shaft 433 of the gearbox 432 also supports a collar 462 from which extends a pair of pins 463 adapted to engage the actuating arms 464 of a pair of control switches 465 mounted on a plate 466 secured to the frame member 430. The switches 465 control solenoid valves for reversing and stopping the motor 435.

Control system

As mentioned above, the forging presses 265 are operated in timed relation by the interconnecting drive provided by the motors 252 and gear belts 418. In addition, the rotary table 175 is indexed in timed relation with the operation of the presses 265 as a result of the drive connection between the center motor 252 and the indexing transmission within the housing 172.

A series of switches (not shown) are mounted within a housing 470 (FIG. 2) and are actuated by corresponding cams (not shown) mounted on a common shaft which is driven in timed relation with the operation of the presses 265 and table 175 by an output shaft 471 (FIG. 10) extending from the transmission 172 and connected through a right angle gearbox 472. These switches control in timed sequence a corresponding series of solenoid valves which, in turn, control the supply of hydraulic fluid from a hydraulic pump system to the pair of hydraulic cylinders 58 (FIG. 3) and actuators 65 for the transfer arm 55, the motor 78 and cylinders 92 for operating the mechanism 50, the hydraulic cylinder 125 of the drop forging press 110, and the hydraulic oscillating motors 145 and 162 for transfer arms 150.

The switches within the housing 474 also control the solenoid valves for the supply of hydraulic fluid to the motor 235 for the crank member 220 to produce the radial movement of the gripping devices 185, to the motor 435 for operating the transfer arm 440, and to the three cylinders 212 for opening and closing the pinch fingers 193 of the gripping devices 185 at the two receiving and one discharge stations.

Operation

To illustrate the operation of the forging apparatus shown in FIGS. 1 and 2, each rod R is transferred from the furnace conveyor 45 to the transfer arm 55. As mentioned above, this rod has a length of approximately twice the length of a completely forged lug wrench as shown in FIG. 24. Each rod R is then transferred by the arm 55 to the first set of aligned saddle supports 88 mounted on the pair of arms 85 and is thereafter transferred in successive steps by the arms 85 to each of the progressive die sets 130 mounted on the die members 127 and 128 of the drop forging press 110.

The central portion of each rod R is tapered, shaped and trimmed to convert the rod into two separate straight rods R' each having a screw driver tip 32. The pair of rods R' are then transferred simultaneously by the arms 150 each moving through an angle of approximately 60°, and are positioned radially in relation to the two transfer devices 170 located at the corresponding two receiving stations as indicated in FIG. 2. Each rod is gripped by two sets of fingers 193 of the corresponding gripping devices 185 when the corresponding cylinder 212 is released.

The indexing of the table 175 presents the outer end portion of each rod R' first to a positioning device 475 (FIGS. 1 and 2) which incorporates a hydraulic cylinder for positioning the outer end of each rod the same distance from the vertical axis of the indexing device 170, and then successively to each of the upset forging presses 265 which progressively from the socket head 34 on the outer end portion of each rod R'. Since two rods R' are transferred simultaneously from the drop forging press 110 to the rotary transfer device 170, the table 175 indexes twice before a second pair of rods R' are transferred by the arms 150. Thus the hydraulic press 110 operates at half the speed of each the upset forging presses 265.

When the rams 320 of the presses 265 are retracted and the corresponding die members 372 are raised by the springs 410, the hydraulic motor 235 for the crank member 220 is actuated causing all of the gripping devices 185 and rods R' to be retracted, after which the table 175 is indexed. The motor 235 is then reversed, and the rods R' are extended so that each rod R' is successively presented to each press 265 and then to the transfer and bending device 425 where the rod is placed by its gripping device 185 within the slot 447 with the socket head 34 positioned outwardly of the pin 455 and finger 448 as shown in FIG. 21. After each rod is positioned within the slot 447, the fingers 193 of the gripping device 185 are opened, and the arm 440 is rotated clockwise (FIG. 23) by the motor 435.

While the arm 440 is rotating, the hydraulic oscillating motor 452 is energized to rotate the block 454, causing the pin 455 to bend the rod R' around the curved surface 449 of the finger 448 and thereby to produce the angular shank 31 of the wrench shown in FIG. 24. When the arm has rotated approximately 180°, the lever 456 (FIG. 21) actuates the valve 458 for the motor 452 so that the wrench 30 is released and drops either onto a conveyor or into a suitable tote box. Simultaneously, one of the switches 465 is actuated which reverses the motor 435 to return the arm 440 to its home position shown in FIGS. 21 and 23 so that it can receive the next rod R'.

Summary

From the drawings and the above description, it can be seen that forging apparatus constructed in accordance with the present invention provides many desirable features and advantages. For example, the transfer mechanism 50 (FIG. 4) with the pair of gyrating arms 85 provides a simplified means for successively advancing a workpiece to a series of progressive die sets 130 in the drop forging press 110.

Another feature is provided by the rotary transfer device 170 wherein the radially moving gripping devices 185 are operated with harmonic motion to present each workpiece or rod R' to the progressive series of die sets 370 mounted on the forging presses 265 disposed radially in relation to the rotary transfer device 170. The construction of each transfer device 185 also provides the advantage of minimizing heat transfer from the preheated workpiece by providing the two sets of pinch fingers 193 having small contact area and which open and close simultaneously to grip and hold the workpiece in a positive radial position in relation to the table 175.

The construction of each of the forging presses 265 also provides desirable features. For example, with a disk-like crank member 275 supported by spaced apart large diameter anti-friction bearings 274 with the worm gear drive connection between the bearings, and with the twin arms 322 connecting the crank member 275 to the ram 320, the driving forces are balanced on the centerline of the press, which significantly reduces wear especially during high speed operation. In addition, the support and drive for the crank member 275 and the connecting arms 322 provides for an overall compact construction. The crank member construction also provides for selecting a stroke of precise length since the bore 309 for the shaft 310 can be precisely located and machined within the crank member 275.

The use of the anti-friction recirculating roller bearings 332 provide a further feature in that the bearings can be preloaded to eliminate any play or lateral movement of the ram 320, which is highly desirable for minimizing wear at high speed operation. Similarly, the use of the preloaded anti-friction linear bearing 355 for supporting the plunger 340 also provides for supporting the plunger for high speed axial movement without lateral play.

Another important advantage is provided by forming the cam surface 404 on the arm 360 of each forging press and employing the movable roller head 385 between the cam surface and the adustable wedge plate 400. That is, this structure provides for high speed opening and closing of the die sets 370 with precise control and minimum wear. While the roller head 365 is connected by the rod 398 to the ram 320 for movement with the ram, the roller head 385 could be moved independently of the movement of the ram 320, as for example, by employing a separate hydraulic cylinder for moving the roller head.

The overall drive system for the presses 265 and for indexing the transfer device 170 provides another feature. For example, by interconnecting the drive shafts 290 of the presses 265 with the motor 252 through the series of gearbelts 418, and by driving the indexing drive transmission 172 with one of the motors 252, the linear movement of the ram 320 of each press 265 and the indexing of the table 175 are synchronized at all times so that the progressive forging operations are all performed in timed relation for producing the lug wrench 30 with maximum speed and efficiency so that the rods R' do not require re-heating.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Forging apparatus comprising transfer means rotatable on a vertical axis and having means for receiving a successive series of workpieces, a plurality of upset forging presses disposed radially in relation to said transfer means, said presses including power driven means for progressively forging each workpiece to a predetermined configuration, and means for indexing said transfer means for successively transferring each workpiece to each said forging press.

2. Forging apparatus as defined in claim 1 wherein said means for receiving a workpiece include means for releasably gripping the workpiece, and means for moving said gripping means radially in relation to said axis of said transfer means for positioning the workpiece in corresponding predetermined relation to said forging means of each said press.

3. Forging apparatus as defined in claim 1 wherein said transfer means comprises a rotary table, a plurality of angularly disposed gripping devices mounted on said table, and means for actuating each said gripping device at a predetermined station for gripping and releasing a workpiece.

4. Forging apparatus as defined in claim 3 wherein each said gripping device includes at least one pair of fingers, means rotatably supporting each said finger, and power operated means for effecting simultaneous rotation of said fingers in opposite directions to provide for piniching and releasing a workpiece.

5. Forging apparatus as defined in claim 3 including means supporting each said gripping device for radial movement on said table for positioning the corresponding workpiece is predetermined relation to said forging means of each said press.

6. Forging apparatus as defined in claim 5 wherein said supporting means include radially extending guide means mounted on said table for slidably supporting each said gripping device, crank means rotatably mounted on said table, power drive means for rotating said crank means relative to said table, and means connecting each said gripping device eccentrically to said crank means to produce simultaneous harmonic movement of each said gripping device for smoothly and quickly presenting and retracting each workpiece relative to each said press.

7. Forging apparatus as defined in claim 5 including furnace means for preheating each workpiece, and power operated means for successively transferring each preheated workpiece to said gripping devices on said table.

8. Forging apparatus as defined in claim 7 including a hydraulically operated forging press having a series of progressive die sets, and said means for successively transferring preheated workpieces including eccentrically driven means for progressively advancing each workpiece to each said die set for performing preliminary forging operations on each workpiece.

9. A forging press comprising a housing, a disk-like crank member, a set of spaced bearings mounted on said housing and rotatably supporting said crank member, a ram, means connected to said housing and supporting said ram for predetermined linear movement, crank arm means, shaft means connecting said crank arm means to said crank member eccentrically of its axis of rotation and outboard of said bearings, shaft means pivotally connecting said crank arm means to said ram, means for connecting a die member to said ram, and power drive means connected to said crank member between said bearings for rotating said crank member to produce reciprocation of said ram and said die member.

10. A forging press as defined in claim 9 wherein said power drive means includes a drive shaft, bearing means on said housing for rotatably supporting said drive shaft on an axis perpendicular to the rotatable axis of said crank member, a ring gear mounted on said crank member between said bearings, a worm gear mounted on said drive shaft for engaging said ring gear, a flywheel mounted on said drive shaft, and a motor connected to rotate said drive shaft.

11. A forging press as defined in claim 9 wherein said crank arm means comprises a pair of crank arms spaced to receive said ram and said crank member therebetween, and said shaft means comprises a shaft extending axially through said crank member for connecting said arms to said crank member and a parallel spaced shaft extending through said ram normal to its direction of movement for connecting said crank arms to said ram.

12. A forging press as defined in claim 9 where said means supporting said ram includes a pair of linear anti-friction bearings mounted on said housing and spaced on opposite sides of said ram to support said ram for high speed reciprocal movement with minimum frictional resistance and substantially no lateral play.

13. A forging press as defined in claim 9 including first and second die members for gripping the workpiece, means rigidly connected to said housing for supporting said first die member, an arm pivotally connected to said housing and supporting said second die member for movement relative to said first die member, and cam means associated with said arm and connected to said ram for moving said arm in response to reciprocation of said ram for opening and closing said die members.

14. A forging press as defined in claim 13 wherein said cam means comprises a cam surface formed on said arm, spring means connecting said arm to said housing for biasing said second die member from said first die member, an adjustable wedge plate mounted on said housing, and roller means connected to said ram and engaging said cam surface and said wedge plate for pivoting said arm to move said second die member toward said first die member in response to forward movement of said arm.

15. A forging press as defined in claim 9 wherein said means for connecting said die member to said ram comprises an elongated rod mounted on said ram and extending forwardly therefrom, means for removably connecting said die member to said rod and an anti-friction sleeve bearing mounted on said housing and supporting said rod for axial movement.

16. A forging press as defined in claim 15 wherein said rod includes means defining a passageway therein, means defining a chamber within said ram and connected to said passageway, and flexible conduit means connected to said chamber for circulating cooling fluid through said passageway to cool said die member.

17. In combination with a plurality of angularly arranged forging presses, an improved device for successively transferring a workpiece to said presses, comprising a rotary table, a plurality of angularly disposed gripping devices mounted on said table, each said gripping device including means for gripping and releasing a workpiece, radially extending guide means mounted on said table and supporting each said gripping device for radial movement, crank means rotatably mounted on said table, means for rotating said crank means relative to said table, and means connecting each said gripping device eccentrically to said crank means to effect simultaneous harmonic movement of said gripping devices for quickly and smoothly positioning each workpiece in predetermined relation relative to each said forging press.

18. In combination with a drop forging press having a series of progressive die sets, a mechanism for successively transferring elongated preheated workpieces to each said die set, comprising a pair of parallel spaced support arms arranged with said die sets spaced therebetween, a set of aligned support members on said arms for each said die set, means carried by said arms for releasably retaining the workpieces on said support members, a set of rotary crank members connected to each said arm, and power drive means for rotating said crank members for moving said arms in a circular path while maintaining said arms substantially horizontal and is parallel for progressively advancing each workpiece to each said die set.

19. In a forging press including a housing, a crank member rotatably supported in said housing, a ram disposed within said housing and connected to said crank member to provide reciprocating movement of said ram, the improvement for supporting said ram comprising a pair of anti-friction linear bearings mounted on said housing and spaced on opposite sides of said ram, each said bearing including preloaded rolling members arranged in coplanar relation for supporting said ram for high speed reciprocating movement with minimum friction and substantially no lateral play.

20. In a forging press as defined in claim 19, a cylindrical plunger connected to said ram and extending parallel to its direction of movement, and an anti-friction sleeve bearing mounted on said housing and surrounding said plunger for high speed axial movement with minimum friction and substantially no lateral play.

21. A forging press comprising a housing, a crank member rotatably supported within said housing, drive means for rotating said crank member, a ram supported within said housing for linear movement, means connecting said ram to said crank member eccentrically to its axis of rotation, means connected to said ram for supporting a punch, a set of female die members cooperating to define a cavity, an arm pivotally connected to said housing and supporting one of said die members for movement relative to the other said die member, means forming a cam surface on said arm, means forming a generally flat surface on said housing in spaced relation to said cam surface, a roller member movable between said flat and cam surfaces, and means for moving said roller member to pivot said arm for opening and closing said die members in predetermined timed relation with the movement of said punch.

22. A press as defined in claim 21 wherein said means for moving said roller member comprises means connecting said roller member to said ram for simultaneous movement of said roller member with said ram.

23. A press as defined in claim 21 wherein said roller member comprises a plate member defining a plurality of parallel spaced slots, parallel spaced rows of rollers disposed within said slots, and a pair of parallel spaced shafts extending through said plate and supporting rollers within said slots.

References Cited
UNITED STATES PATENTS

| | | | |
|---|---|---|---|
| 1,892,168 | 12/1932 | Siegel | 72—405 |
| 2,027,406 | 1/1936 | Spatta | 72—306 |

RONALD D. GREFE, Primary Examiner.

U.S. Cl. X.R.

72—405, 421